June 5, 1923.
J. A. SINCELL
ANTISKID CHAIN
Filed Jan. 27, 1923
1,458,107
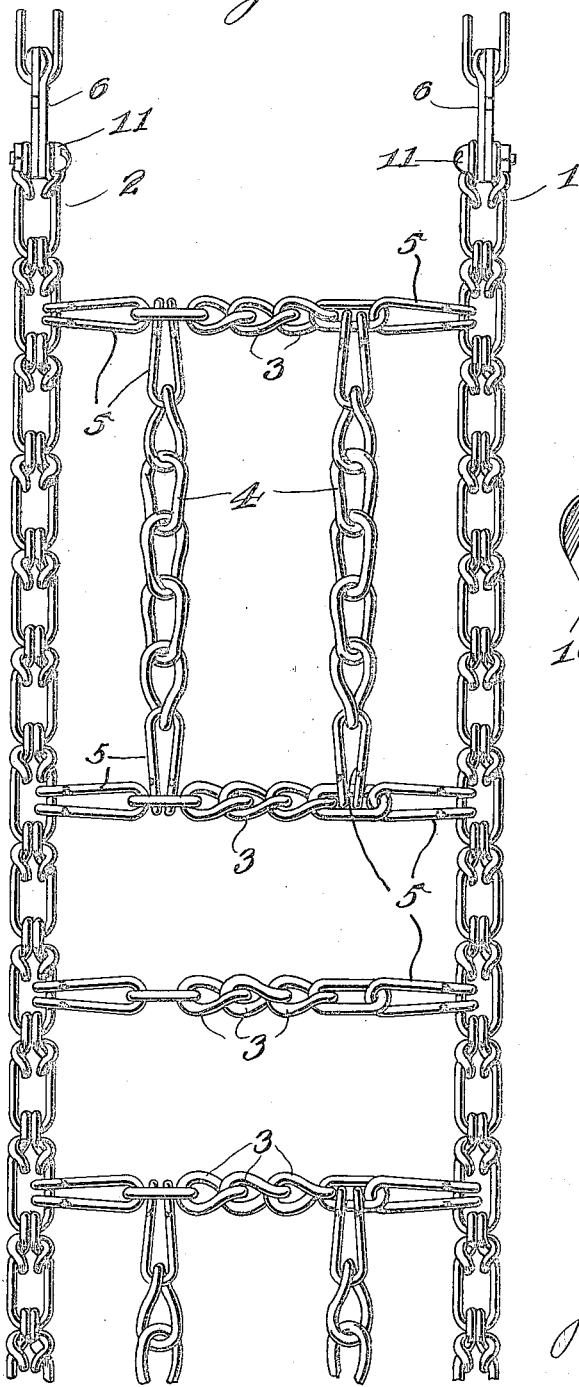
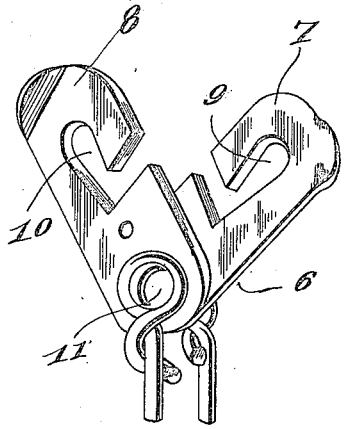
Inventor
Jos. A. Sincell Patented June 5, 1923.

1,458,107

UNITED STATES PATENT OFFICE.

JAMES ALBERT SINCELL, OF GRAFTON, WEST VIRGINIA.

ANTISKID CHAIN.

Application filed January 27, 1923. Serial No. 615,252.

*To all whom it may concern:*

Be it known that I, JAMES ALBERT SINCELL, a citizen of the United States, residing at Grafton, in the county of Taylor and State of West Virginia, have invented certain new and useful Improvements in Antiskid Chains, of which the following is a specification.

The present invention relates to anti-skid chains used upon the tires of vehicle wheels, and aims to provide such a device of novel and improved construction whereby to enhance traction on roads or pavements that are wet, muddy or otherwise dangerous to motor vehicle traffic.

Another object of the invention is the provision of an anti-skid chain which is comparatively simple in construction, being composed of few parts and can be manufactured at a relatively low cost.

A further object of the invention is the provision of an anti-skid chain which is so constructed that should one or more of the links thereof become impaired they can be expeditiously replaced at comparatively low cost.

The invention also has for an object, the provision of an anti-skid chain which can be quickly applied to and removed from the tire without the use of implements for that purpose and which when applied will effectually prevent skidding of the vehicle upon which it is mounted.

With the foregoing and other objects in view, which will be apparent as the invention is better understood, the invention resides in the construction and arrangements of parts, hereinafter described and claimed, it being understood that changes can be made within the scope of what is claimed without departing from the spirit of the invention.

The invention is illustrated in the accompanying drawing, wherein:

Figure 1 is a plan view of a portion of the anti-skid chains,

Figure 2 is a perspective view of the locking means for the ends of the side chains.

Referring to the accompanying drawing in which like reference characters designate like parts the numerals 1 and 2 respectively designate the longitudinally extending side chains which may be and preferably are constructed of the common form of links as shown.

The numeral 3 designates tread chains which extend transversely of the tire tread at circumferentially spaced intervals and have their ends connected with the side chains.

The numeral 4 designates longitudinally extending chains which are disposed between adjacent transversely extending chains and have their ends connected thereto.

It is to be particularly noted that the chains 4 are provided only at circumferentially spaced intervals as shown, or more specifically, the anti-skid chain structure composed of the chains 1, 2, 3 and 4, provides a construction composed of circumferentially extending side members having arranged therebetween alternately disposed rectangular chain members and transversely extending chain members, such construction resulting from the arrangement of the chains 4 between only a portion of adjacent chains 3.

It is to be noted that the chains 3 are unequally spaced, the chains 3 to which the chains 4 are connected are spaced approximately at a distance equal to that between the ends of adjacent pairs of chains 4 there being a chain 3 arranged in each of said spaces between the pairs of chains 4.

The chains 3 and 4 are preferably constructed of twisted links of the well known form and are connected to each other and to the side chains by means of the links 5 as shown.

The chains 3 are shown as being provided with straight links which receive the links 5 of chains 4 but this is not essential as twisted links may be used as well.

The ends of the side chains are provided with means 6 to facilitate the connecting and disconnection thereof when applying and removing the chain structure.

The said means are clearly shown in Figure 2 and each consists of two plates 7 and 8 provided with the angular slots 9 and 10 respectively and the plates are pivoted together by the pivot 11 and are connected to the end of a side chain adjacent said pivot. Each side chain carries one of said means 6 at one end and the link at the opposite end is adapted to be engaged in said slots 9 and 10 upon closing of the plates 7 and 8.

The transversely extending chains 3 function to prevent skidding in the direction of travel or the spinning of the wheel upon sudden starting or the skidding thereof upon application of the brakes while the chains 4 function to prevent side skidding of the vehicle.

Having thus described the invention, what is claimed is:

1. An anti-skid chain for tires, comprising circumferentially arranged side chains, circumferentially spaced transversely disposed chains arranged between the side chains and connected thereto, and circumferentially extending chains located between the side chains and terminally connected to a portion of the transversely disposed chains.

2. An anti-skid chain for tires, comprising circumferentially arranged side chains, transversely and circumferentially spaced circumferentially extending chains located between the side chains, transversely extending chains connected to the side chains and to the terminals of the circumferentially spaced chains and other transversely extending chains arranged between the circumferentially spaced chains.

3. An anti-skid chain for tires, comprising a series of circumferentially spaced rectangular chain elements, a series of transverse chain elements located between the rectangular chain elements and alternating therewith, and circumferentially extending side chains connected with said rectangular and transverse chain elements.

4. An anti-skid chain for tires, comprising circumferentially extending side chains, transversely extending chains between the side chains and connected thereto and a chain device located between each two transversely extending chains, said chain device comprising a pair of transversely extending chains terminally connected to the side chains and a pair of circumferentially extending chains transversely spaced from each other and from the side chains and terminally secured to the last mentioned transversely extending chains.

5. A non-skid chain for tires, comprising circumferentially extending side chains, a plurality of transversely extending circumferentially spaced chains between the side chains and connected thereto, said transversely extending chains being unequally spaced, and circumferentially extending chains terminally connected to the transversely extending chains of greatest circumferential spacing.

In testimony whereof I affix my signature.

JAMES ALBERT SINCELL.